(12) United States Patent
Waitlevertch (10) Patent No.: US 7,939,012 B2
(45) Date of Patent: May 10, 2011

(54) SKIMMER APPARATUS AND METHOD (75) Inventor: Joseph R. Waitlevertch, Butler, PA (US)

(73) Assignee: ESM Group Inc., Amherst, NY (US)

( * ) Notice: Subject to any disclaimer, the term of this patent is extended or adjusted under 35 U.S.C. 154(b) by 487 days.

(21) Appl. No.: 12/111,404

(22) Filed: Apr. 29, 2008

(65) Prior Publication Data
US 2009/0267274 A1    Oct. 29, 2009

(51) Int. Cl.
*C22B 7/04*    (2006.01)
(52) U.S. Cl. .......................................... 266/228; 266/44
(58) Field of Classification Search ............... 266/44, 266/228, 227
See application file for complete search history.

(56) References Cited

U.S. PATENT DOCUMENTS

| | | | | |
|---|---|---|---|---|
| 3,659,833 A | * | 5/1972 | Grant | 266/228 |
| 3,712,601 A | * | 1/1973 | Brown | 266/228 |
| 3,800,965 A | * | 4/1974 | Barron et al. | 414/787 |
| 3,883,124 A | * | 5/1975 | Galer | 266/228 |

* cited by examiner

*Primary Examiner* — Scott Kastler
(74) *Attorney, Agent, or Firm* — Hodgson Russ LLP (57) ABSTRACT

An embodiment in accordance with the present invention provides an apparatus and a method for skimming slag from molten metal including a base, wherein the base pivots around an axis, a mast mounted on the base, a carriage including wheels and the wheels engage the plurality of posts, an outer beam disposed perpendicular to the mast and within an inner space of the carriage, and including walls defining a slot and powered wheels, an inner beam disposed movably within the slot of the outer beam and in frictional contact with the powered wheels, and rams including one end mounted on the other beam and the other end mounted on one of the base or the mast. This configuration provides at least four degrees of freedom to the apparatus in order to skim the slag from the molten metal.

19 Claims, 10 Drawing Sheets

SKIMMER APPARATUS AND METHOD

FIELD OF THE INVENTION

The present invention relates generally to a method and apparatus for skimming a slag from molten metal. More particularly, the present invention relates to a skimmer having multiple degrees of freedom of movement.

BACKGROUND OF THE INVENTION

Slag is a by-product formed in smelting, and other metallurgical and combustion processes. Slag is formed from impurities in metals or ores being treated by processes such as desulphurization, and it consists mostly of mixed oxides and sulfides of elements such as silicon, aluminum, calcium, magnesium, phosphorus, and the like. During smelting or refining, slag floats on the surface of the molten metal. This slag must then be removed from the surface of the molten metal. One way to remove the slag is to skim it from the surface of the molten metal using a skimmer apparatus. However, many skimmers do not have a wide range of motion or many degrees of freedom of movement.

Accordingly, it is desirable to provide an improved method and apparatus to remove the slag from molten metal before the purified metal product is further processed or used.

SUMMARY OF THE INVENTION

The foregoing needs are met, to a great extent, by the present invention, wherein in one aspect an apparatus is provided that in some embodiments provides a skimmer apparatus and method with at least four degrees of freedom of movement for removing the slag from molten metal.

In accordance with one aspect of the present invention, a skimmer apparatus to remove a slag from molten metal includes a base, wherein the base pivots around an axis, and a mast mounted on the base and including a plurality of posts defining an interior space. The skimmer apparatus can also include a carriage including walls that define an inner space and wheels mounted on an outer surface of the walls, wherein the carriage is mounted within the interior space of the mast and the wheels engage the plurality of posts, an outer beam disposed perpendicular to the mast and within the inner space of the carriage, and including walls defining a slot and powered wheels, and an inner beam disposed movably within the slot of the outer beam and in frictional contact with the powered wheels. Rams including one end mounted on the base and a second end mounted on the outer beam are also included in the skimmer apparatus.

In accordance with another aspect of the present invention, the skimmer apparatus includes an upper base and a lower base mounted on a top surface of the lower base, and, wherein the lower base comprises a pivot axis and the upper base pivots around the pivot axis. There may be at least two rams and the rams are mounted at an angle to the base and are simultaneously extendable. The rams may also be extended or retracted one at a time and may be powered by hydraulics.

In accordance with still another aspect of the present invention, a means for skimming a slag from molten metal includes a means for pivoting a skimmer arm around an axis, a means for moving the skimmer arm along a vertical axis, a means for moving the skimmer arm along a horizontal axis, and a means for tilting the skimmer arm.

In accordance with yet another aspect of the present invention, a method for moving a skimmer includes pivoting a mast mounted on an upper base about an axis wherein an outer beam is disposed through an inner space defined by the mast, and moving the outer beam vertically on the mast using a carriage mounted within the inner space of the mast. The method also includes tilting the outer beam using rams and moving an inner beam disposed within an inner space of the outer beam along a horizontal axis using powered wheels. Additionally, the method includes pivoting the upper base around a pivot axis on a lower base, and using wheels mounted on the carriage to move the carriage vertically on the mast.

In accordance with another aspect of the present invention, the method includes tilting the outer beam using two rams and can also include tilting the outer beam by extending one ram of the two rams and keeping the other ram of the two rams stationary. The method further includes, tilting the outer beam by retracting one ram of the two rams and keeping the other ram of the two rams stationary and extending both of the two rams to move the outer beam along the vertical axis. The method can also include retracting both of the two rams to move the outer beam along the vertical axis.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present invention provides an apparatus and a method for removing slag from molten metal. The embodiments in accordance with the present invention may include a base, wherein the base pivots around an axis, a mast mounted on the base, a carriage including wheels and the wheels engage the plurality of posts, an outer beam disposed perpendicular to the mast and within an inner space of the carriage, and including walls defining a slot and powered wheels, an inner beam disposed movably within the slot of the outer beam and in frictional contact with the powered wheels, and rams including one end mounted on the base and a second end mounted on the outer beam.

Figure 1:
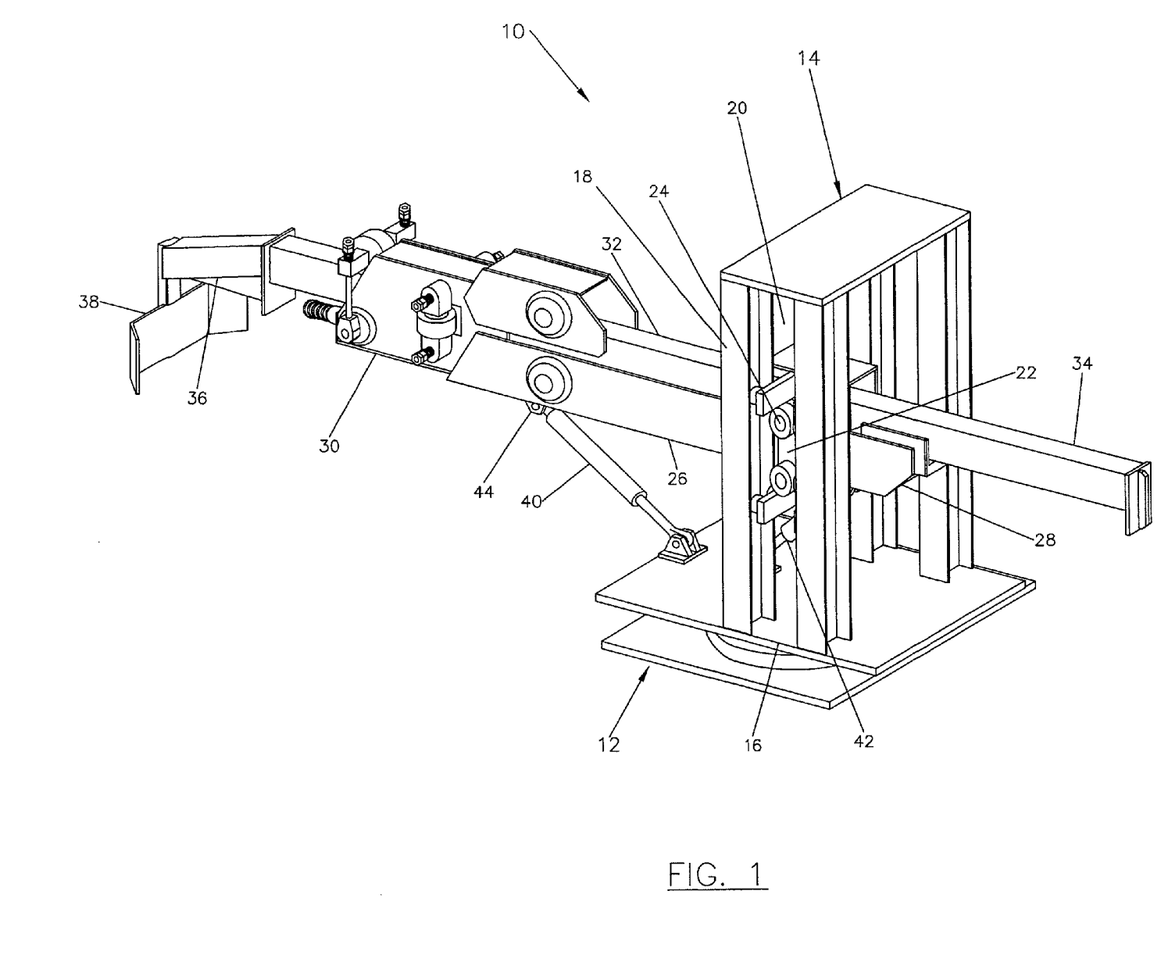
FIG. 1 is a perspective view illustrating a skimmer in accordance with an embodiment of the invention.

FIG. 1 is a perspective view illustrating a skimmer 10 in accordance with an embodiment of the invention. FIG. 1 illustrates a base 12 having a mast 14 mounted on a top surface 16 of the base 12. The mast 14 has posts 18 defining an open space 20 within the mast 14. A carriage 22 is disposed within the open space 20 and includes wheels 24, which engage the posts 18 of the mast 14. An outer beam 26 includes a proximal end 28 and a distal end 30. The outer beam 26 is mounted to the carriage 22 within the open space 20 within the mast 14. An inner beam 32 having a proximal end 34 and a distal end 36 is slidably disposed within the outer beam 26, and a rake 38 is mounted on the distal end 36 of the inner beam 32. Additionally, two rams 40, 42 are connected to an underside 44 of the outer beam 26 and also to the base 12.

Figure 2A:
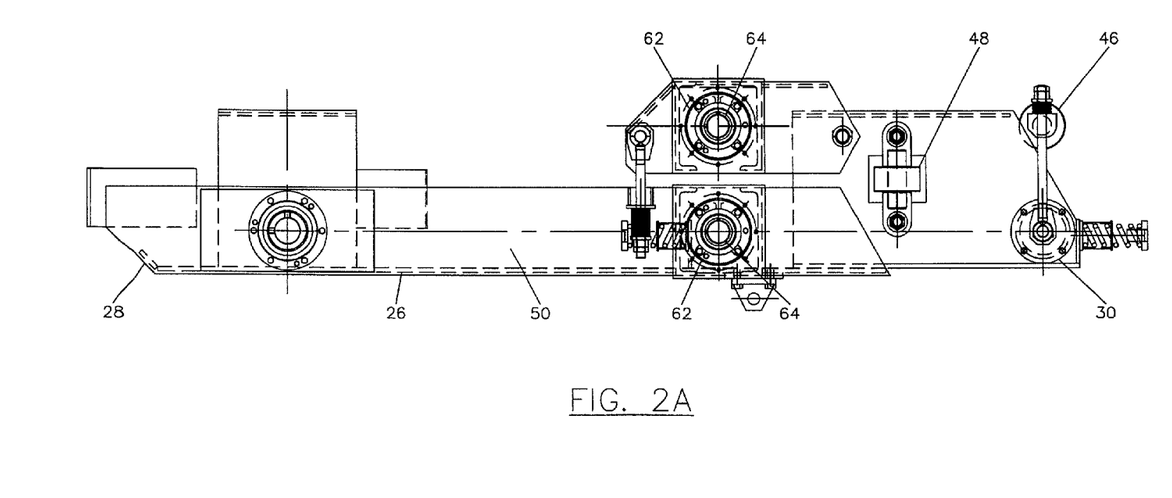
FIGS. 2A, 2B, 2C and 2D are cross sectional views illustrating an outer beam of the skimmer in accordance with an embodiment of the invention.
Figure 2B:
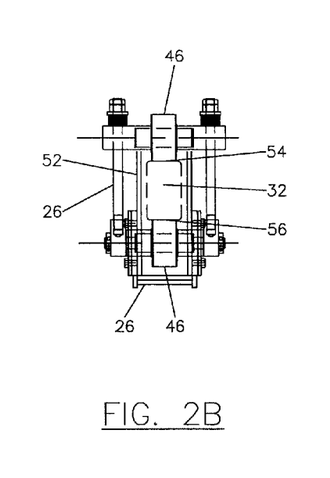

FIGS. 2A, 2B, 2C and 2D are sectional views illustrating an outer beam of the skimmer in accordance with an embodiment of the invention. FIG. 2A illustrates a partially sectional view of the outer beam 26 of the skimmer apparatus. Wheels 46 and 48 are mounted at the distal end 30 of the outer beam 26. Wheels 46 are situated perpendicular to a horizontal axis 50 of the outer beam 26. Wheels 46 of the outer beam 26 are also shown in FIG. 2B, which illustrates a section taken along axis A-A. Wheels 46 are partially disposed within an inner space 52 of the outer beam 26 and are in contact with a top surface 54 and a bottom surface 56 of the inner beam 32.

Figure 2C:
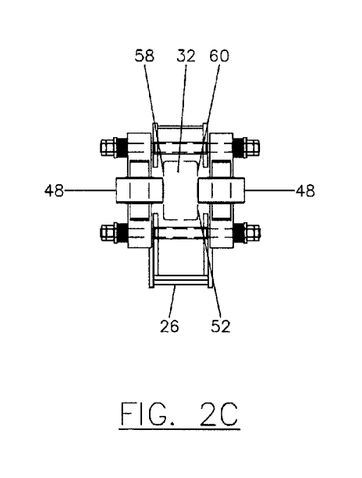

FIG. 2A also illustrates wheels 48 are situated parallel to the horizontal axis of the outer beam 26. Wheels 48 are also illustrated in FIG. 2C, which illustrates a section taken along axis B-B. Wheels 48 are also partially disposed within an inner space 52 of the outer beam 26 and are in contact with side surfaces 58, 60.

Figure 2D:
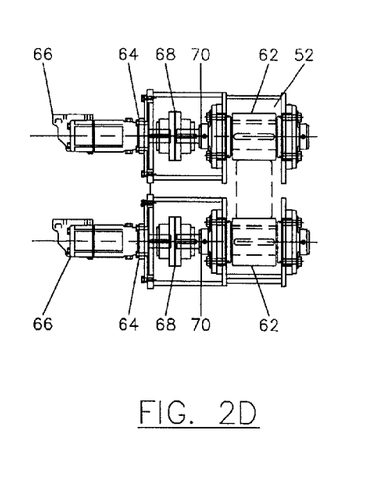

FIG. 2A further illustrates, powered wheels 62 mounted on the outer beam 26. A power source can be attached to opening 64 defined by the outer beam 26. Powered wheels 62 are also shown in FIG. 2D, which illustrates a section taken along axis C-C. Powered wheels 62 are disposed within an inner space 52 of the outer beam 26. A power source 66 can be coupled to the outer beam at opening 64. In turn, the power source 66 is connected to a motor 68 which is coupled to an axle 70 which turns the powered wheels 62. The powered wheels 62 are in frictional contact with the top surface 54 of the inner beam 32, but could also be placed such that they were in frictional contact with the side surfaces 58, 60 of the inner beam 32.

Figure 3A:
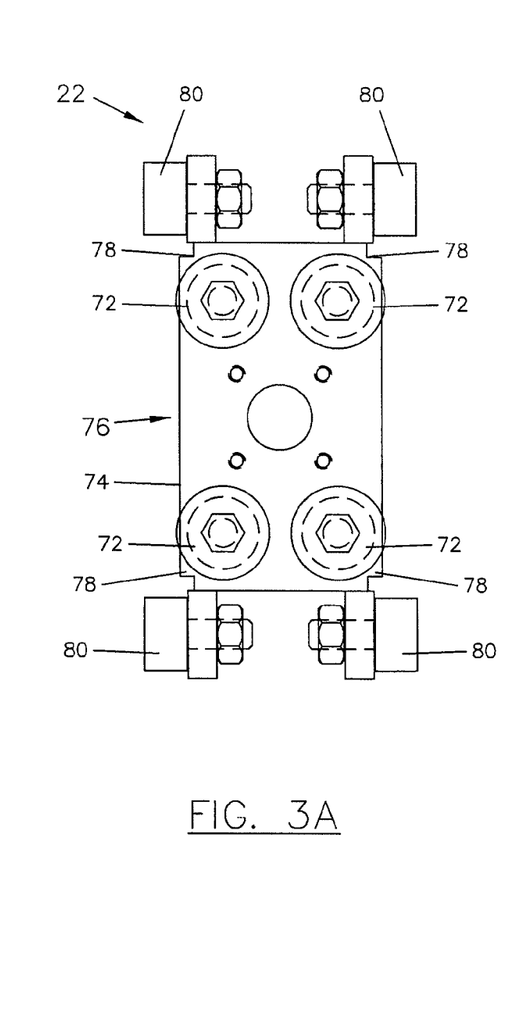
FIGS. 3A and 3B are perspective views illustrating a side carriage assembly in accordance with an embodiment of the invention.

FIG. 3A illustrates a carriage assembly 22 in accordance with an embodiment of the present invention. Wheels 72 are mounted on a top surface 74 of carriage base plate 76. Here, the carriage base plate 76 takes the shape of a rectangle having four corners 78. However, this is not meant to limit the shape that the carriage base plate 76 may take in other embodiments. Wheels 72 are passive and facilitate movement of the outer beam 26, shown in FIG. 1, vertically with respect to the mast 14, also shown in FIG. 1. As shown in FIG. 3A the carriage 22 includes four wheels 72, one mounted at each of the four corners 78 of the carriage base plate 76. Also positioned at each of the four corners 78 of the carriage base plate 76 are the carriage side wheel assemblies 80 described in more detail with respect to FIG. 3B. As shown, the carriage 22 includes four side wheel assemblies 80 on at each of the four corners of the carriage base plate 76.

Figure 3B:
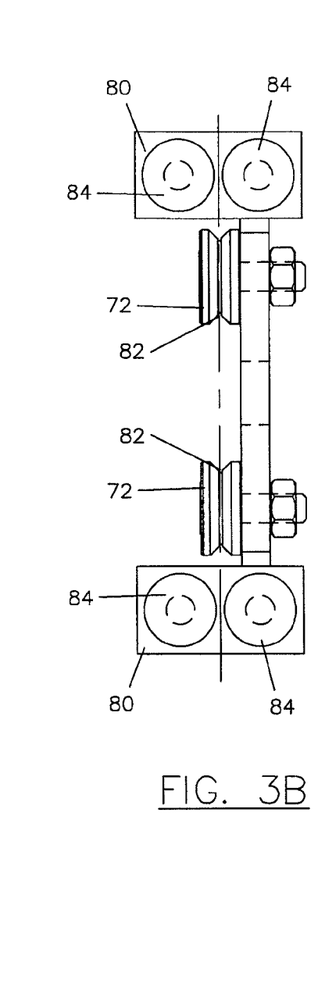

FIG. 3B illustrates a perspective view of a carriage assembly 22 in accordance with an embodiment of the present invention. Wheels 72 are bolted to the carriage base plate 76 and include a groove 82 which engages an edge of the post 18 of the mast 14 as shown in FIG. 1. The carriage side wheel assemblies 80 also include wheels 84 that facilitate movement of the outer beam 26, as shown in FIG. 1. Two wheels 84 are shown mounted on the carriage side wheel assemblies 80, but any number of wheels may be used to facilitate the movement of the carriage 22.

Figure 4A:
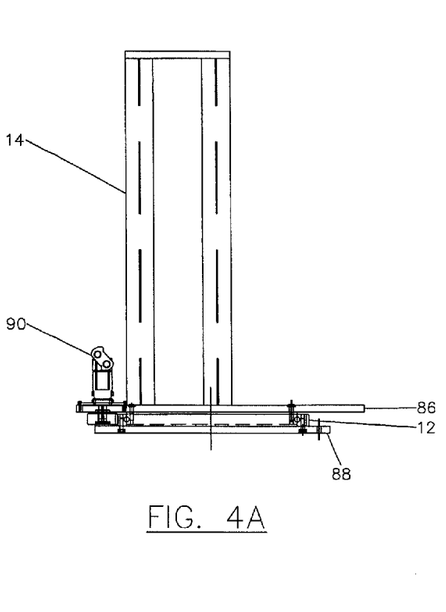
FIGS. 4A and 4B are perspective views illustrating a base in accordance with an embodiment of the invention.
Figure 4B:
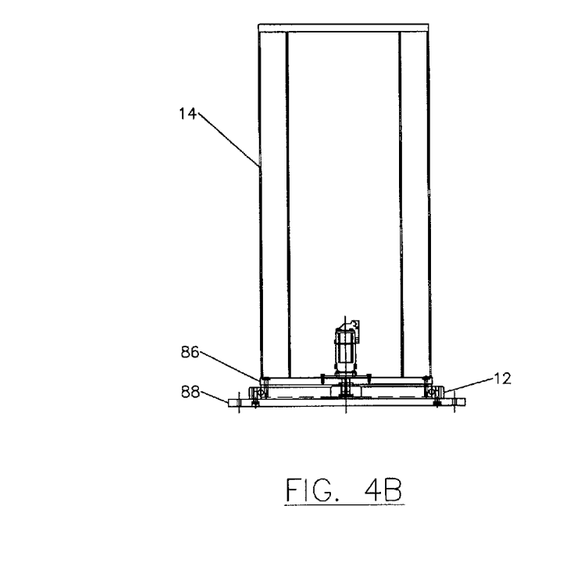

FIGS. 4A and 4B are perspective views illustrating the base 12 in accordance with an embodiment of the invention. The base 12 has an upper platform 86 and a lower platform 88. The mast 14 is mounted on the upper platform 88. A motor 90 is also mounted on the upper platform 88. The motor 90 extends through an opening defined by the upper platform 86 and couples to a lower motor component 92, which engages the lower platform 88. A cross sectional view of the motor taken along section A-A is illustrated in more detail in FIG. 4C.

Figures 4C, 4D:
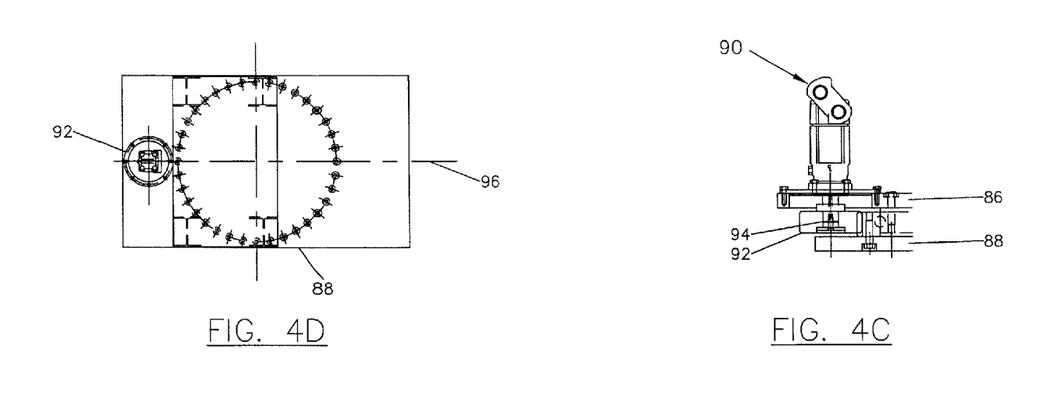
FIG. 4C is a cross sectional view along section A-A illustrating a motor in accordance with the embodiment illustrated in FIGS. 4A and 4B.
FIG. 4D is an aerial view illustrating the base in accordance with the embodiment illustrated in FIGS. 4A-4C.

FIG. 4C illustrates a cross sectional view of a motor taken along section A-A in accordance with an embodiment of the invention as illustrated in FIG. 4B. An axle 94 turned by the motor 90 extends through an opening defined by the upper platform 86. The axle 94 then turns the lower motor component 92 mounted on a distal end 96 of the axle 94. The lower motor component 92 engages the lower platform 88 to pivot the upper platform 86 about an axis of the lower platform 88, illustrated in more detail in FIG. 4D.

FIG. 4D is an aerial view illustrating the base in accordance with the embodiment illustrated in FIGS. 4A-4C. FIG. 4D illustrates in more detail the range of motion of the lower motor component 92 and the axis of rotation of the lower platform 88. Both the lower motor component 92 and the upper platform 86 rotate about axis 96 of the lower platform 88.

Figure 5A:
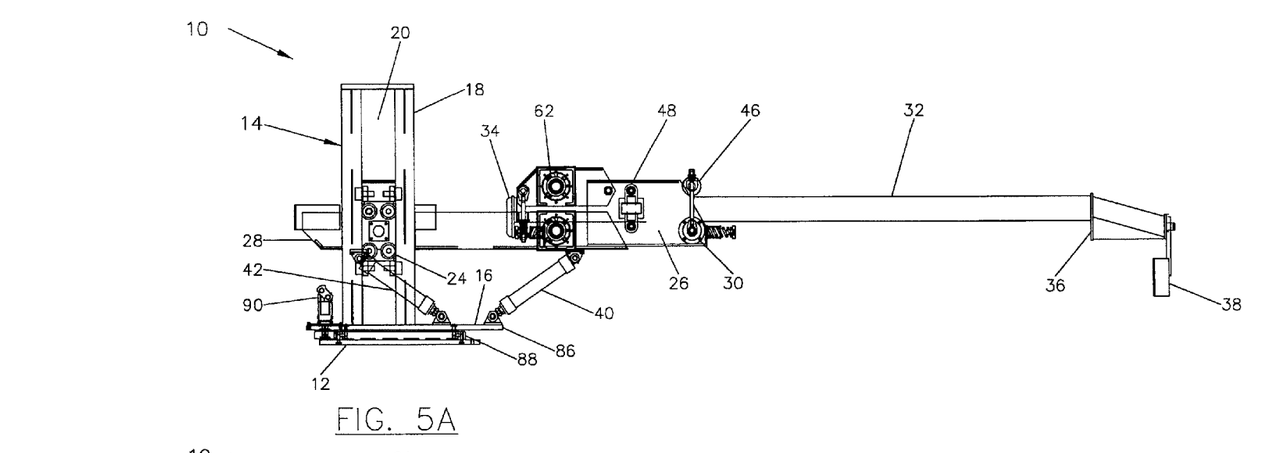
FIGS. 5A and 5B are perspective views illustrating a range of motion of a rake in accordance with an embodiment of the invention.
Figure 5B:
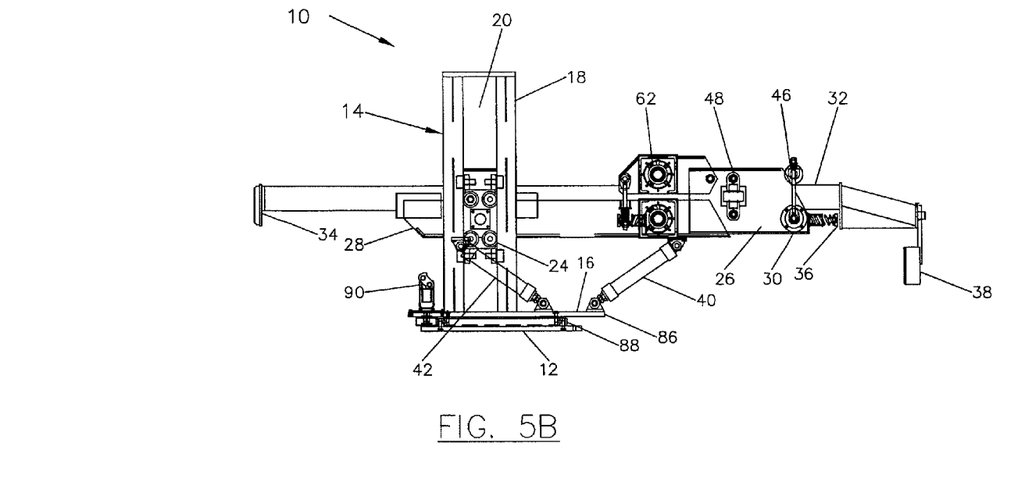

FIGS. 5A and 5B are perspective views illustrating a range of motion of the rake in accordance with an embodiment of the invention. FIG. 5A illustrates the inner beam 32 extended out fully from the distal end 30 of the outer beam 26 and FIG. 5B illustrates the inner beam 32 retracted fully in toward the distal end 30 of the outer beam 26. The powered wheels 62 in frictional contact with the inner beam 32 extend or retract the inner beam 32. Wheels 46 and 48 provide stability to the inner beam 32 as it is extended or retracted by the powered wheels 62. As the inner beam 32 is extended or retracted, the rake 38, mounted on the distal end 36 of the inner beam 32 is moved forward and backward. This motion facilitates skimming slag from molten metal. The inner beam 32 may be retracted or extended using other means, such as a chain and sprocket, electric motor, hydraulics, or compressed air.

Figure 6A:
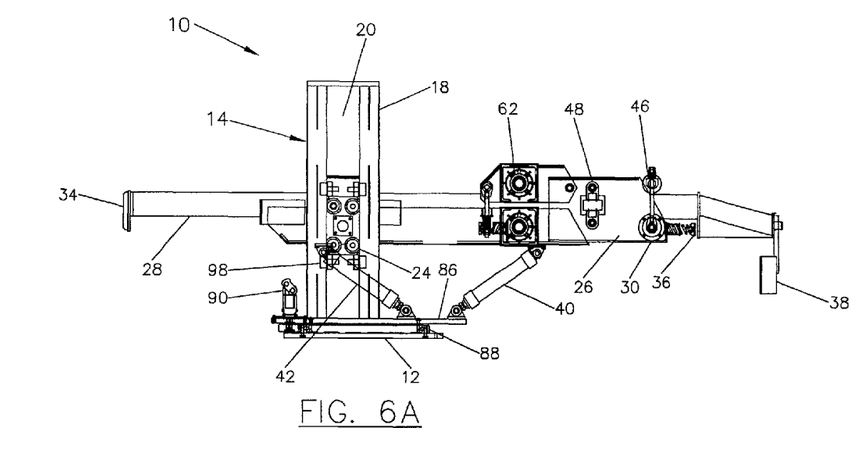
FIGS. 6A and 6B are perspective views illustrating a range of motion of the carriage in accordance with an embodiment of the invention.
Figure 6B:
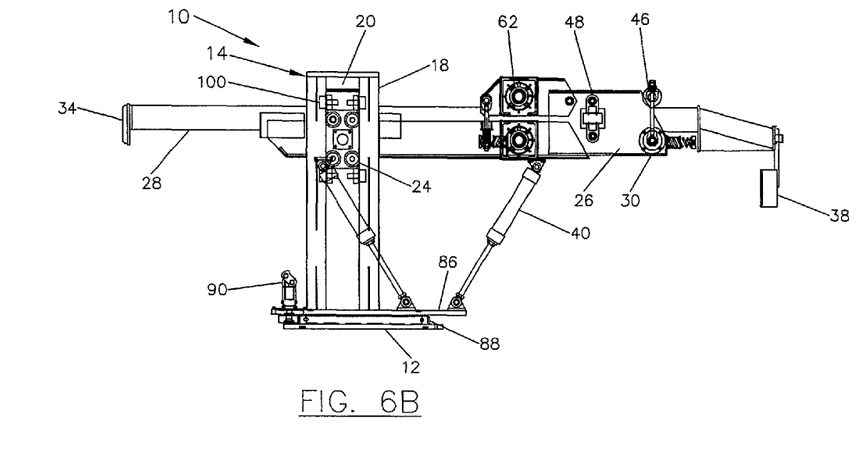

FIGS. 6A and 6B are perspective views illustrating a range of motion of the carriage in accordance with an embodiment of the invention. FIG. 6A illustrates the carriage 22 at its lowest vertical point 98 and FIG. 6B illustrates the carriage 22 at its highest vertical point 100. The carriage 22 may be positioned at any point between point 98 and point 100. To lower the carriage 22, ram 40 and ram 42 are both retracted an equal amount. To raise the carriage 22, ram 40 and ram 42 are both extended an equal amount. Raising and lowering the carriage 22, in turn, raises and lowers the rake 38 mounted on the distal end 36 of the inner beam 32. This vertical range of motion allows the rake to skim the slag from molten metal at varying depths.

Figure 7A:
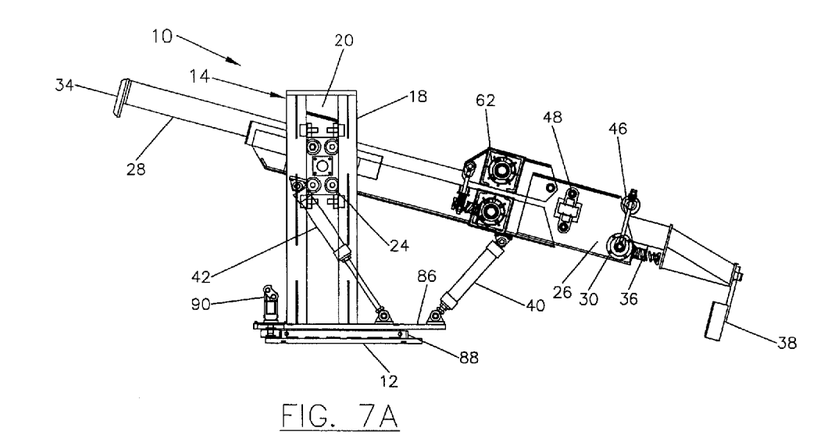
FIGS. 7A and 7B are perspective views illustrating a range of motion of tilting the outer beam in accordance with an embodiment of the invention.
Figure 7B:
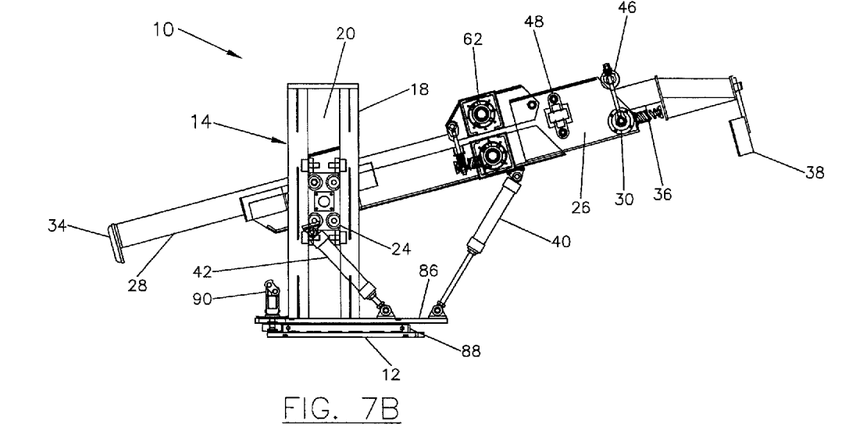

FIGS. 7A and 7B are perspective views illustrating a range of motion of tilting the outer beam in accordance with an embodiment of the invention. FIG. 7A illustrates the outer beam 26 tilted down and FIG. 7B illustrates the outer beam 26 tilted up. In order to tilt the outer beam 26 down, ram 40 is retracted and ram 42 is extended. Retracting ram 40 and extending ram 42 raises the carriage 22 to lift the proximal end 28 of the outer beam 26 and drops the distal end 30 of the outer beam 26, to tilt the outer beam 26 down. The downward tilting range of motion for the outer beam is approximately fifteen degrees. However, the range of motion may be increased or decreased in other embodiments and this approximation of the range of motion is not meant to be limiting.

As illustrated in FIG. 7B, in order to tilt the outer beam 26 up, ram 40 is extended and ram 42 is retracted. Extending ram 40 and retracting ram 42 lowers the carriage 22 to drop the proximal end 28 of the outer beam 26 and lift the distal end 30 of the outer beam 26 to tilt the outer beam up. The upward tilting range of motion is approximately fifteen degrees. However, the range of motion may be increased or decreased in other embodiments, and this approximation of the range of motion is not meant to be limiting.

Figure 8A:
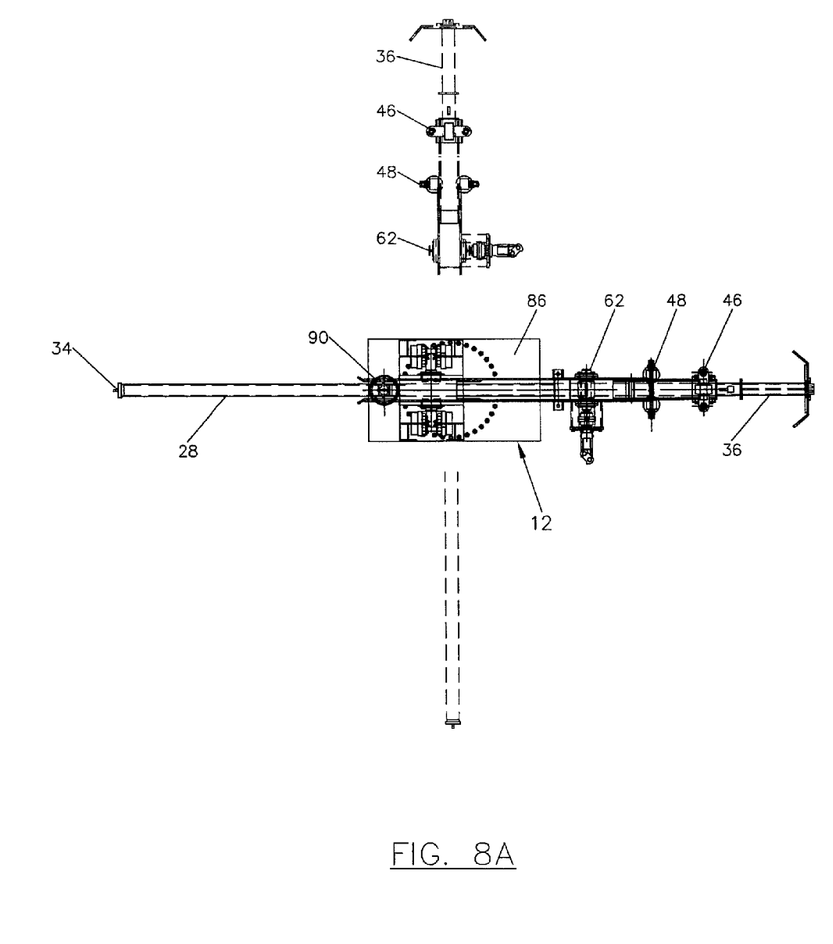
FIGS. 8A and 8B are aerial views illustrating a range of motion of pivoting in accordance with an embodiment of the invention.
Figure 8B:
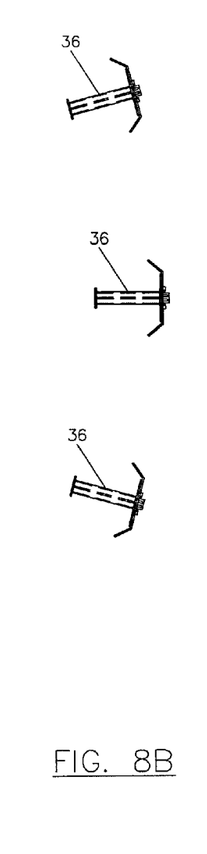

FIGS. 8A and 8B are aerial views illustrating a range of motion of pivoting in accordance with an embodiment of the invention. Engaging the motor 90 causes the upper platform 86 to pivot about the axis 96 of the lower platform 88. The upper platform 86 has a range of motion such that it pivots as far as approximately ninety degrees to the left and as far as approximately ninety degrees to the right. FIG. 8B illustrates the rake 38 pivoting fifteen degrees to the left and fifteen degrees to the right.

Figure 9A:
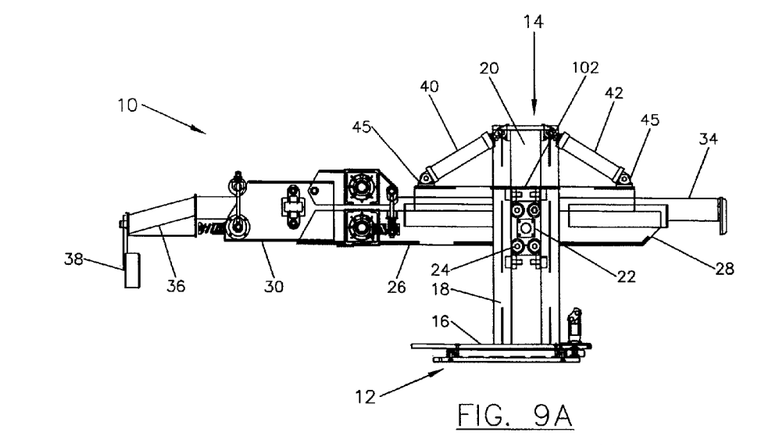
FIGS. 9A and 9B are perspective views illustrating a range of motion of the carriage in accordance with an embodiment of the invention.
Figure 9B:
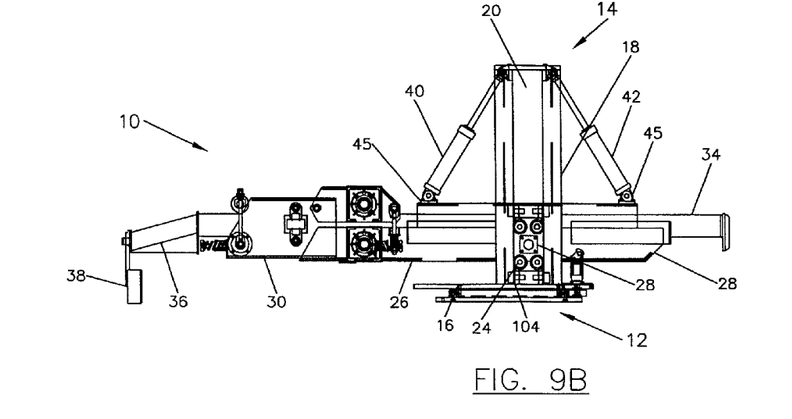

FIGS. 9A and 9B are perspective views illustrating a range of motion of a carriage in accordance with an embodiment of the invention. FIGS. 9A and 9B illustrate a base 12 having a mast 14 mounted on a top surface 16 of the base 12. The mast 14 has posts 18 defining an open space 20 within the mast 14. A carriage 22 is disposed within the open space 20 and includes wheels 24, which engage the posts 18 of the mast 14. An outer beam 26 includes a proximal end 28 and a distal end 30. The outer beam 26 is mounted to the carriage 22 within the open space 20 within the mast 14. An inner beam 32 having a proximal end 34 and a distal end 36 is slidably disposed within the outer beam 26, and a rake 38 is mounted on the distal end 36 of the inner beam 32. Additionally, two rams 40, 42 are connected to a top surface 45 of the outer beam 26 and also to the mast 14.

FIGS. 9A and 9B also illustrate a range of motion of the carriage in accordance with an embodiment of the invention. FIG. 9A illustrates the carriage 22 at its highest vertical point 102 and FIG. 9B illustrates the carriage at its lowest vertical point 104. The carriage 22 may be positioned at any point between point 102 and point 104 by adjusting the length of rams 40, 42. To raise the carriage 22, rams 40, 42 are both retracted an equal amount. To lower the carriage 22 rams 40, 42 are both extended an equal amount. Raising and lowering the carriage 22, in turn, raises and lowers the rake 38 mounted on the distal end 36 of the inner beam 32. This vertical range of motion allows the rake to skim the slag from molten metal at varying depths.

Figure 10A:
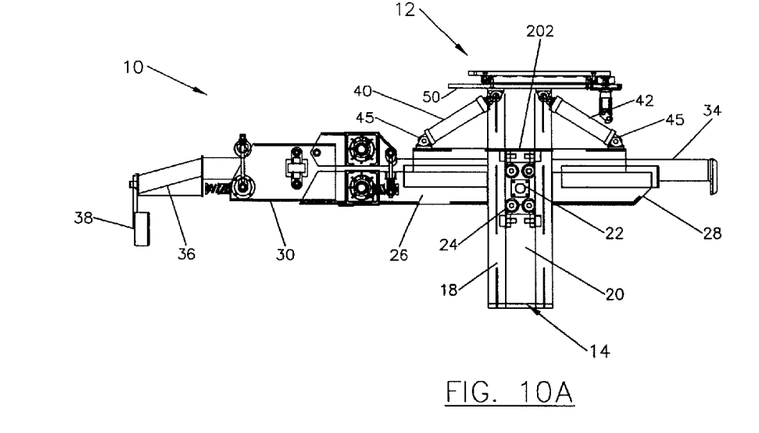
FIGS. 10A and 10B are perspective views illustrating a range of motion of the carriage in accordance with an embodiment of the invention.
Figure 10B:
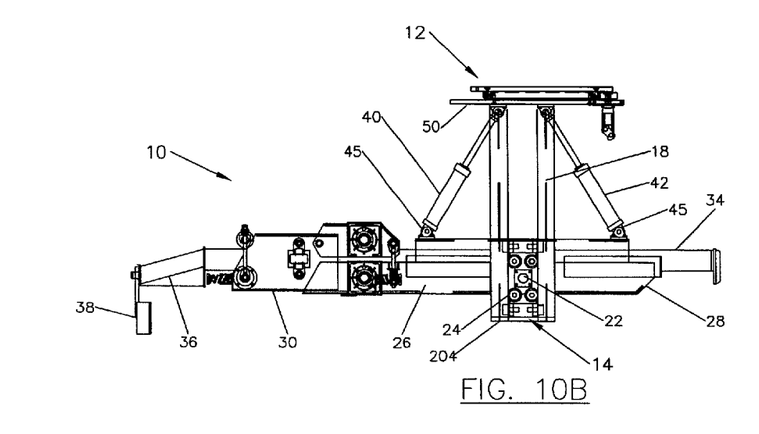

FIGS. 10A and 10B are perspective views illustrating a range of motion of a carriage in accordance with an embodiment of the invention. FIGS. 10A and 10B illustrate a base 12 having a mast 14 attached to a bottom surface 50 of the base 12. The mast 14 is suspended from the bottom surface 50 of the base 12. The mast 14 has posts 18 defining an open space 20 within the mast 14. A carriage 22 is disposed within the open space 20 and includes wheels 24, which engage the posts 18 of the mast 14. An outer beam 26 includes a proximal end 28 and a distal end 30. The outer beam 26 is mounted to the carriage 22 within the open space 20 within the mast 14. An inner beam 32 having a proximal end 34 and a distal end 36 is slidably disposed within the outer beam 26, and a rake 38 is mounted on the distal end 36 of the inner beam 32. Additionally, two rams 40, 42 are connected to a top surface 45 of the outer beam 26 and also to the bottom surface 50 of the base 12.

FIGS. 10A and 10B also illustrate a range of motion of the carriage in accordance with an embodiment of the invention. FIG. 10A illustrates the carriage 22 at its highest vertical point 202 and FIG. 10B illustrates the carriage at its lowest vertical point 204. The carriage 22 may be positioned at any point between point 202 and point 104 by adjusting the length of rams 40, 42. To raise the carriage 22, rams 40, 42 are both retracted an equal amount. To lower the carriage 22 rams 40, 42 are both extended an equal amount. Raising and lowering the carriage 22, in turn, raises and lowers the rake 38 mounted on the distal end 36 of the inner beam 32. This vertical range of motion allows the rake to skim the slag from molten metal at varying depths.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A skimmer apparatus comprising:
    a base, that pivots around an axis;
    a mast mounted on the base;
    a carriage, wherein the carriage is mounted to travel along the mast;
    an outer beam pivotally mounted to the carriage to tilt about an outer beam tilt axis, wherein the outer beam tilt axis travels with the carriage along the mast;
    an inner beam disposed in telescoping relationship with the outer beam; and a first ram and a second ram, each ram including two ends, wherein one end of each ram is mounted on the outer beam;

wherein the first ram and the second ram are configured to move the outer beam and the carriage along the mast; and wherein the first ram and the second ram are configured to tilt the outer beam about the outer beam tilt axis.

2. The skimmer apparatus of claim 1, wherein the base comprises a lower base and an upper base, wherein the upper base is mounted on a top surface of the lower base.

3. The skimmer apparatus of claim 2, wherein the lower base comprises a pivot axis and the upper base pivots around the pivot axis.

4. The skimmer apparatus of claim 1, wherein a second end of each of the first ram and the second ram is mounted on any one of the mast or the base.

5. The skimmer apparatus of claim 1, wherein the mast includes a plurality of posts defining an interior space.

6. The skimmer apparatus of claim 1, wherein the first ram and the second ram are simultaneously extendable.

7. The skimmer apparatus of claim 1, wherein the first ram and the second ram are simultaneously retractable.

8. The skimmer apparatus of claim 1, wherein the first ram and the second ram are independently extendable.

9. The skimmer apparatus of claim 1, wherein the first ram and the second ram are independently retractable.

10. The skimmer apparatus of claim 1, wherein the outer beam includes powered wheels disposed within an inner space of the outer beam to extend or retract the inner beam relative to the outer beam.

11. The skimmer apparatus of claim 1, wherein the first ram and the second ram are hydraulically powered.

12. A system for skimming a slag from molten metal comprising:
a means for pivoting a skimmer arm around a vertical axis;
a means for moving the skimmer arm along the vertical axis;
a means for extending and retracting the skimmer arm along a horizontal axis; and
a means for tilting the skimmer arm about a horizontal axis, wherein the horizontal axis is moved along the vertical axis by the means for moving.

13. A method for moving a skimmer comprising:
pivoting a mast mounted on an upper base about an axis wherein an outer beam is disposed through an inner space defined by the mast;
moving the outer beam vertically on the mast using a carriage mounted within the inner space of the mast, wherein the vertical movement of the outer beam is driven by operating a first ram and a second ram;
tilting the outer beam using the first ram and the second ram; and
moving an inner beam disposed within an inner space of the outer beam along a horizontal axis using powered wheels.

14. The method of claim 13 further comprising, pivoting the upper base around a pivot axis on a lower base.

15. The method of claim 13 further comprising, using wheels mounted on the carriage to move the carriage vertically on the mast.

16. The method of claim 13 further comprising, tilting the outer beam by extending the first ram and keeping the second ram stationary.

17. The method of claim 13 further comprising, tilting the outer beam by retracting the first ram and keeping the second ram stationary.

18. The method of claim 13 further comprising, extending both the first ram and the second ram to move the outer beam along the vertical axis.

19. The method of claim 13 further comprising, retracting both the first ram and the second ram to move the outer beam along the vertical axis.

* * * * *